Oct. 31, 1939.   M. H. GROVE   2,177,825
GAS PRESSURE REGULATOR
Filed Jan. 12, 1937
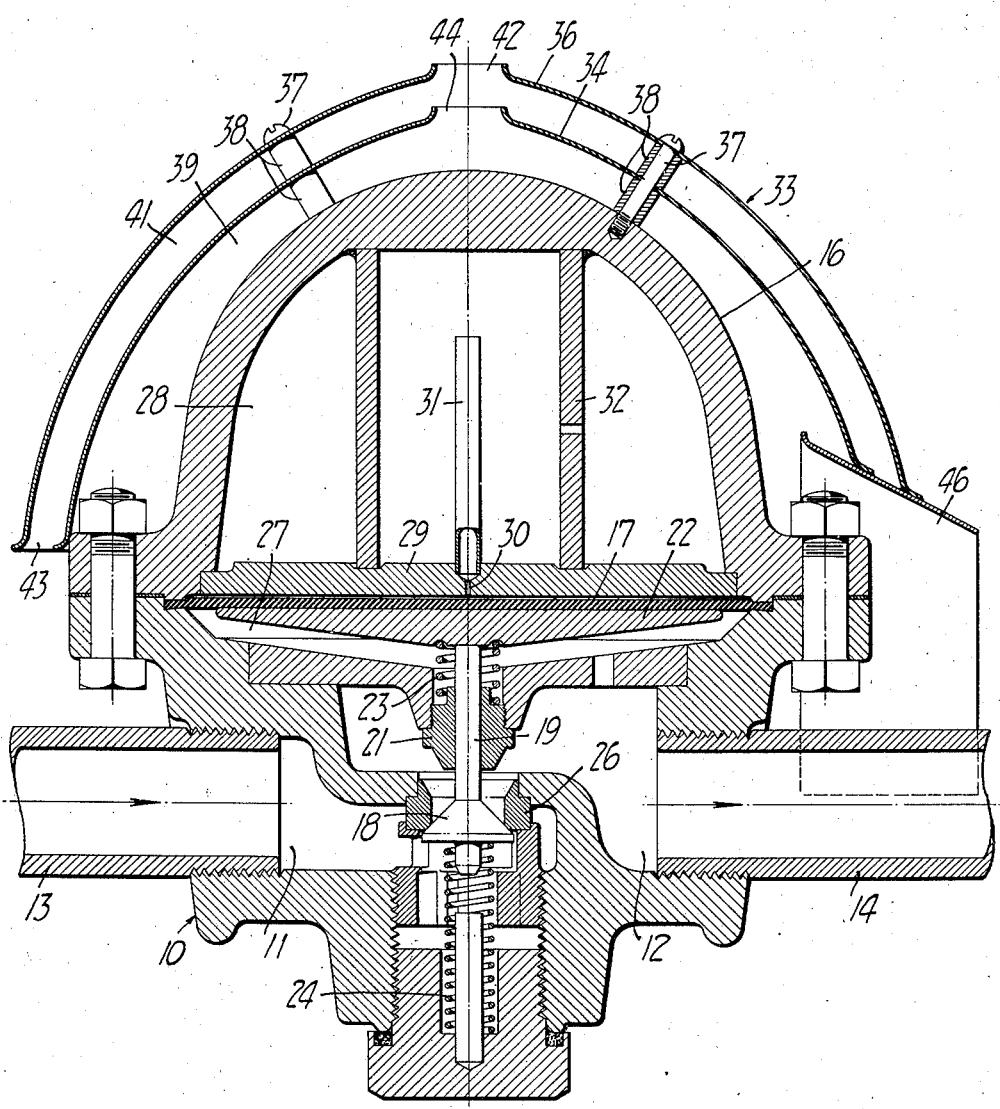
INVENTOR.
Marvin H. Grove
BY
Paul D. Flehr
ATTORNEY.

Patented Oct. 31, 1939

2,177,825

UNITED STATES PATENT OFFICE 2,177,825

GAS PRESSURE REGULATOR

Marvin H. Grove, Berkeley, Calif.

Application January 12, 1937, Serial No. 120,231

2 Claims. (Cl. 50—21)

This invention relates generally to improvements in regulators of the type disclosed and claimed in my co-pending Patent No. 2,047,101, granted July 7, 1936. More specifically the invention applies to regulators making use of a so-called gas pressure dome, by means of which the regulator is loaded, and which takes the place of a biasing spring, in conventional spring-loaded regulators.

It is the primary object of the invention to provide a regulator of the above character having means tending to minimize temperature variations of the trapped loading gas, due to varying climatic conditions, as for example absorption of heat from the sun's rays.

Further objects of the invention will appear from the following description in which the preferred embodiment of the invention has been set forth in detail in conjunction with the accompanying drawing.

The regulator illustrated in the drawing makes use of a special form of cover which jackets the gas dome, and which is ventilated for passage of convection currents of air. The main part of the regulator illustrated, aside from the cover, consists of a body 10, provided with inlet and outlet openings 11 and 12 respectively, which can be connected to the inlet and outlet piping 13 and 14. Clamped upon the body 10 there is a dome 16, formed of suitable material such as forged steel.

The peripheral edge portion of a fluid operated diaphragm 17, is clamped between the dome 16 and the body, and is arranged to operate a flow control valve 18. Thus the valve 18 is shown provided with an operating stem 19, which is guided in bushing 21. The upper end of this stem engages the central part of a thrust plate 22, the upper face of which engages the lower face of diaphragm 17. A light compression spring 23 serves to normally maintain the plate 22 in engagement with the lower face of diaphragm 17. Another light compression spring 24 serves to bias the valve 18 towards its seat ring 26. Below the diaphragm 17 there is a gas chamber 27 which is in communication with the outlet 12, provided the regulator is being used to maintain a constant outflow pressure. It is known to those skilled in the art that when a regulator of this character is being used as a so-called back pressure regulator, the diaphragm is subjected to the pressure of the gas source, instead of to the outflow pressure.

The dome 16 forms a closed gas chamber 28, adapted to contain a predetermined amount of trapped gas under pressure. It is this gas pressure which normally presses down upon the diaphragm 17, and the value of this pressure determines the pressure at which gas will be delivered to the outflow piping 14. It is to be understood that provision is made for adjusting the pressure of gas in chamber 28, as for example an arrangement of needle valves such as is disclosed in said Patent No. 2,047,101, and by means of which excess pressure can be vented to the atmosphere, or gas supplied to chamber 28 from the inflow side of the regulator.

The lower face of the dome 16 is provided with a baffle wall or plate 29, which is in close proximity to the upper face of diaphragm 17, when the valve member 18 is in closed position. This plate functions in the same manner as the baffle wall or plate 58, illustrated in Fig. 1 of the aforesaid Patent No. 2,047,101. It is provided with a flow restricting orifice 30, which communicates with the chamber 28, through the short stand pipe 31. A tubular strut 32 is also provided, which has its upper end connected to the dome, and its lower end machined to abut the inner face of the baffle plate 29.

In a regulator of the above character valve 18 is opened by downward flexing of diaphragm 17, when the pressure on the outflow side of the regulator, and the pressure in chamber 27, is somewhat less than the pressure of the trapped gas in dome 16. It is therefore evident that any variation in the pressure of the gas in chamber 28, such as would be caused by a variation in temperature, will cause a corresponding change in outflow pressure. When the regulator is placed in service in an unsheltered place, as is usually the case, exposure to the sun's rays during the daytime may cause a serious increase in temperature of the dome 16, with the result that the gas in chamber 28 will materially increase in pressure, and there will be a corresponding increase in pressure on the outflow side of the regulator.

It is for the purpose of minimizing or avoiding such temperature changes, that I have provided the cover designated generally at 33. This cover consists of a pair of concentric bell-shaped members 34 and 36, which can conveniently be formed of sheet metal. They are shown retained upon the dome 16 by means of screws 37, in conjunction with the spacers 38, whereby a substantial space or passage 39 is formed between the inner member 34 and the dome, and another space or passage 41 formed between the inner and outer members 34 and 36. The upper part of the outer member 36 is provided with a discharge opening or vent 42. At the lower edge of member 36 space 41 is in free communication with the atmosphere, as indicated at 43. Member 34 is also provided with a discharge opening or vent 44, which is aligned with and immediately below the opening 42. The lower part of space 39 communicates with a side hood 46, which in turn is disposed adjacent the outlet piping 14 and communicates with the atmosphere.

The arrangement described above operates as follows: When the cover 33 is exposed to the sun's rays, considerable heat is absorbed by the outer member 36, and this heat is imparted to air within the space 41, to cause upward flow of convection currents of air through this space, into opening 43, and out through the vent 42. At the same time upward currents of air will be caused to flow through the inner space 39, due principally to the proximity of hood 46 with the outflow piping 14. Due to expansion of gas passing through the regulator the outlet piping adjacent the regulator is at a considerable lower temperature than the normal temperature of the dome 16. Thus since the inlet through hood 46 is in proximity with piping 14, it is in communication with a source of relatively cool air, thus tending to cause continued upward flow of cool air through passage 39, to be discharged through the vent 44. Discharge of air from vent 44 through the vent 42, also causes an aspirating action, tending to withdraw air from the upper portion of space 41, and thus induce upwardly flow of air through this outer space. Thus the cover is adequately ventilated, the outer walls of the dome are subjected to air which is generally at a slightly lower temperature than that of the surrounding atmosphere, and the dome is adequately protected from absorption of intense heat from the sun's rays. As a result wide temperature fluctuations of the gas in dome 16 are avoided, and therefore fluctuations of gas pressure on the outflow side are maintained at a minimum.

I claim:

1. In a gas flow regulator, a body having inflow and outflow passages connected with inflow and outflow piping, a fluid operated diaphragm carried within the body, valve means controlled by movements of said diaphragm and serving to control flow of gas through the body, a metal dome or shell secured to the body and forming a closed gas chamber on one side of the diaphragm, said gas chamber being adapted to contain a predetermined amount of gas under pressure to bias the diaphragm in one direction, and a cover for the dome, said cover embracing the dome and spaced from the exterior walls of the same to form a passage for convection currents of air, the upper portion of said cover having a vent to the atmosphere and the lower portion of said cover having an inlet opening communicating with the atmosphere in a region adjacent the outlet piping.

2. In a gas flow regulator, a body having inflow and outflow passages, a fluid operated diaphragm carried within the body, valve means controlled by movements of said diaphragm serving to control flow of gas through the body, a metal dome or shell secured to the body and forming a closed gas chamber on one side of the diaphragm, said gas chamber being adapted to contain a predetermined amount of gas under pressure to bias the diaphragm in one direction, and a cover serving to jacket the dome, said cover comprising spaced inner and outer members forming between them a passage for flow of convection currents of air, and also forming a passage for convection currents of air between the inner member of the cover and the exterior surface of the dome, the first named passage of the cover having an upper vent communicating with the atmosphere and a lower inlet opening likewise communicating with the atmosphere, the second named passage being vented through the inner member of the cover to discharge into said first named vent, said second passage also having an inflow opening communicating with the atmosphere in a region adjacent the outlet piping of the regulator.

MARVIN H. GROVE.